(12) United States Patent
Sutardja

(10) Patent No.: US 6,430,238 B1
(45) Date of Patent: Aug. 6, 2002

(54) DIGITAL SERVO CHANNEL FOR RECORDING APPARATUS

(75) Inventor: Pantas Sutardja, San Jose, CA (US)

(73) Assignee: Marvel International, Ltd., Hamilton (BM)

( * ) Notice: Subject to any disclaimer, the term of this patent is extended or adjusted under 35 U.S.C. 154(b) by 0 days.

(21) Appl. No.: 09/605,133

(22) Filed: Jun. 27, 2000

Related U.S. Application Data

(63) Continuation of application No. 09/049,830, filed on Mar. 27, 1998, now Pat. No. 6,125,154.
(51) Int. Cl.[7] .............................................. H04L 27/08
(52) U.S. Cl. .................. 375/345; 455/245.1; 369/44.36
(58) Field of Search ................................. 375/377, 345; 360/109, 71, 77.05, 77.08, 77.02, 75, 44.29, 44.35; 369/43, 44.11, 44.26, 44.29, 44.35, 44.36; 330/254; 455/232.1, 234.1, 245.1

(56) References Cited

U.S. PATENT DOCUMENTS

| 4,833,418 A | * | 5/1989 | Quintus et al. | |
| 5,321,560 A | | 6/1994 | Cowen | |
| 5,452,147 A | * | 9/1995 | Yamashita et al. | 360/46 |
| 5,483,393 A | | 1/1996 | Mento et al. | |
| 5,523,902 A | | 6/1996 | Pederson | |
| 5,767,900 A | * | 6/1998 | Tanji et al. | 348/253 |
| 5,831,781 A | * | 11/1998 | Okamura | 360/31 |
| 6,009,549 A | * | 12/1999 | Bliss et al. | 714/769 |
| 6,114,882 A | * | 9/2000 | Flynn | 327/103 |

* cited by examiner

Primary Examiner—Jean Corrielus
(74) Attorney, Agent, or Firm—Eric B. Janofsky

(57) ABSTRACT

A servo channel digitally processes the data read from a magnetic media. The channel uses both edges of a system clock to detect peaks and generates position error systems by an area-based automatic gain control loop. By altering the sample delay, the channel digitally, up-samples at higher rates without requiring a higher system clock.

13 Claims, 9 Drawing Sheets

DIGITAL SERVO CHANNEL FOR RECORDING APPARATUS

RELATED APPLICATION

This application is a continuation application entitled to priority from application Ser. No. 09/049,830, filed on Mar. 27, 1998, now U.S. Pat. No. 6,125,154.

FIELD OF THE INVENTION

This invention relates to servo pulse detection and position error signal demodulation for information storage/retrieval devices, such as magnetic disk drives.

BACKGROUND OF THE INVENTION

Servo detection and demodulation are commonly used in disk/tape drives in which information is stored on multiple tracks on a storage medium. In order to increase the storage density of these devices, the tracks are placed closer together, resulting in a tighter tolerance specification for positioning the read/write head over the surface of the medium. In a magnetic disk drive, servo data are usually written on the storage medium once during the manufacture of the drive. The servo patterns typically contain gray-coded track/sector identification (ID) information as well as positioning error information. When read by a magnetic pickup head, these data patterns present themselves as analog waveforms corrupted by electronics and media noise. The servo pulse detection circuit converts the analog pulses in the gray-code ID field of the servo pattern into clearly distinguishable digital pulses so that the information can be further processed using simple logic circuits. A servo error demodulator circuit determines the positioning error of the head relative to the center of the nearest track the head is located on. Conventional servo pulse detectors are typically designed using analog peak detectors similar to the conventional peak detector circuit used for the main data channel in magnetic disk. Integrating the servo channel and the main data channel on a monolithic silicon chip is relatively simple and has been a cost effective solution. However, with the advent of digital maximum likelihood channels which improves the recording density of magnetic disk drives, the main data channel circuitry becomes predominantly digital. Implementing the servo channel using digital circuitry thus become more desirable to ease the integration of the servo and main data channels.

It is desirable to provide a digital circuit technique for servo pulse detection and servo error demodulation which are compatible with the circuit techniques used in a digital read channels.

SUMMARY OF THE INVENTION

Several difficulties arise when performing digital pulse peak detection in digital domain. The main problem is that discrete time signal processing introduces a time quantization effect that can be reduced only through using a higher system sampling rate. The present invention uses both system clock edges to perform digital pulse peak detection to mitigate the inaccuracies caused by discrete time signal processing.

The present invention includes an area-based automatic gain control loop. This provides a very desirable feature of generating position error signals that are already normalized and independent of the incoming input frequency spectra when, for example, the head moves across multiple recording zones.

The present invention also includes a differentiating bandpass filter for servo burst filtering, independent of the equalizing filter used for servo pulse detection. The differentiation characteristic of this filter enables the accuracy of position error signal (PES) demodulation to be independent of the offsets in the analog front end circuits of the channel. The bandpass characteristic of the filter removes much of the noise in the PES bursts, resulting in a higher accuracy in PES demodulation in the presence of wide band input noise.

In the following description, we will use the term "digital data" or "digital vector" to imply a group of related digital signal bits (e.g., a digital bus, or a group of related digital buses) that represents an analog signal in digital domain. The term "digital signal" refers to a single bit digital line.

The input to the servo channel of the present invention is a first analog signal read back from the servo data field of a storage media. The servo data field contains a synchronization field, followed by a gray-code ID field and then a multiple of position error burst fields.

The servo channel also includes a programmable gain amplifier (PGA) to amplify the first analog signal to a second analog signal. An analog filter filters the second analog signal to provide a third analog signal. An analog to digital converter (ADC) digitizes the third analog signal to provide a first digital data. A digital differentiator receives a first digital data and provides, in response thereto, a second digital data. A digital up-sampler processes the second digital data to provide a plurality of digital data, each of which is an interpolated version of the second digital data at a different sampling delay. The digital up-sampler provides a higher equivalent sampling rate of the system without actually operating any circuits at a higher clock rate. An absolute value function circuit rectifies the interpolated digital data and sums them together to provide a fourth digital data. A digital area-based gain control unit (AGU) compares the signal level of the fourth digital data against a target value and generates a fifth digital data which controls the gain setting of the PGA. The AGU adjusts the gain of the PGA until the signal level of the fourth digital data achieves a certain target value. The signal path starting from the first analog signal to the fifth digital data forms an automatic gain control loop. This loop is active during the synchronization field of the servo loop. The gain of the PGA is frozen after the synchronization field.

A programmable coefficient digital FIR filter equalizes the first digital data to provide a sixth digital data. A digital peak detector processes the sixth digital data to provide a servo pulse signal and an optional pulse polarity signal. The FIR filter and the digital peak detector used to provide a cleanly detected gray-code ID pulses for further servo ID detection by external control logic.

A digital area integrator integrates the fourth digital data to provide a plurality of digital outputs representing the servo position error signal (digital PES). This digital PES data can be read directly by an external servo DSP unit outside of this invention. An optional digital to analog converter (DAC) array converts the digital PES data back to analog PES signals to provide compatibility for back end servo processor systems that expect to receive the demodulated PES signals in analog form.

The digital area gain control unit comprises a first integrator which substantially integrates every half cycle of the servo sync field section of the fourth digital data. This is achieved by making the half cycle period in the servo sync-field substantially equal to an integer multiple of the sampling clock period. The half cycle integrated value is compared against a target level and a difference value is generated and referred to as the gain error data. The gain error data is further accumulated by a second integrator to produce the gain control data for the PGA. The second integrator includes a saturator to prevent overflow or underflow of the gain control data.

The digital peak detector comprises a differentiator, a threshold detector and a zero-crossing detector. The differentiator converts peaks in the incoming data into zero-crossings in its outgoing data. The threshold detector produces a valid-positive-peak data indicator any time the incoming signal is greater than a certain positive threshold, and a valid negative peak indicator when the signal is below a certain negative threshold. The zero-crossing detector produces a negative-servo-pulse output and a positive-servo-pulse output. The negative servo-pulse is asserted when a positive transitioned zero crossing is detected and the valid-negative-pulse output is asserted. The positive servo-pulse is asserted when the negative transitioned zero crossing is detected and the valid-positive-pulse output is asserted. An optional OR gate combines the positive servo-pulse and the negative servo-pulse signals together to provide a composite servo-pulse output. An optional set-reset flip-flop has its set and reset inputs controlled by the negative-servo-pulse and the positive-servo-pulse to provide an output indicating the original polarity of the servo pulse for the composite servo-pulse output. A multiplexer selects either the separated negative/positive servo pulse signals, or the composite and polarity signals as the output of the servo pulse detector.

The digital area integrator for PES demodulation integrates the PES burst field section of the fourth digital data each time the burst gate control signal is asserted. The integration length is the smaller of the burst gate assertion time period and a programmed burst count value. The integrated value is sequentially loaded into a plurality of registers upon every deassertion of the burst gate signal. Under normal operation, the burst gate assertion time period in number of the servo system clock preferably is longer than the programmed burst count value. The user may also program the burst count value so that the total integration time substantially covers an integral multiple of the servo PES burst cycles for improved PES demodulation accuracy.

DETAILED DESCRIPTION

Figure 1:
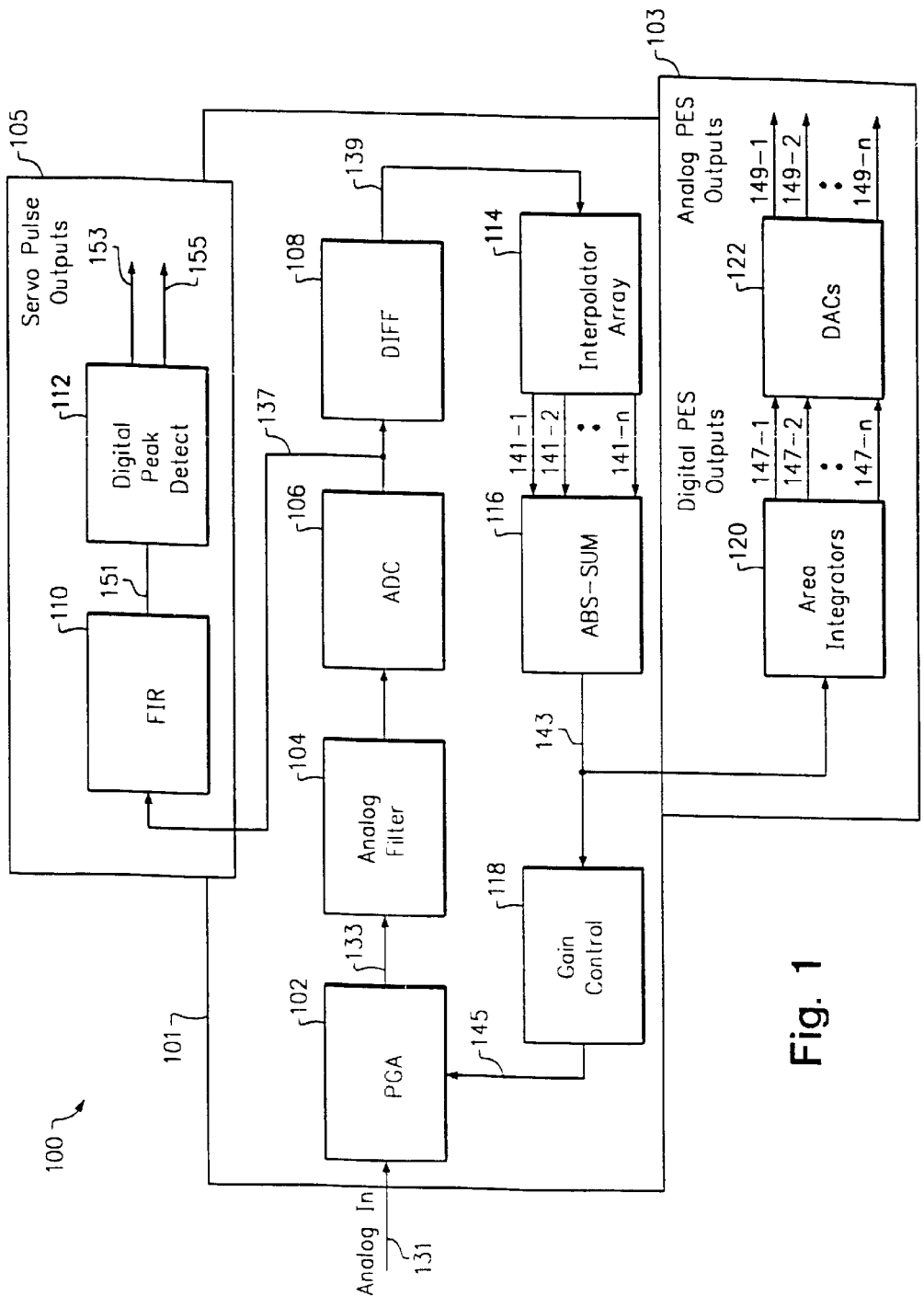
FIG. 1 is a block diagram illustrating a digital servo channel in accordance with the present invention.

Referring to FIG. 1, there is shown a schematic block diagram illustrating a digital servo channel 100 in accordance with the present invention. The digital servo channel 100 includes an automatic gain controller 101, a digital position error demodulator 103, and a servo gray code pulse detector 105.

The automatic gain controller 101 includes a programmable gain amplifier (PGA) 102, an analog filter 104, an analog-to-digital converter (ADC) 106, a digital differentiator 108, an interpolator array 114, an absolute value summer circuit 116, and a digital gain control circuit 118. An analog input signal 131 from a transducer (not shown) is applied to an input of the programmable gain amplifier (PGA) 102, which provides an amplified analog signal 133 to the input of the analog filter 104 in response to the input signal 131 and to a gain control vector 146. The analog filter 104 provides a filtered analog signal 135 to the input of an analog-to-digital converter (ADC) 106. In some channels 100, the analog filter 104 need not be present, and, in these channels, the analog signals 133 and 135 are identical. The ADC 106 digitizes the filtered analog signal 135 to provide a raw digital vector 137, which is a digital representation of the analog signal 135, to the digital differentiator 108. The digital differentiator 108 preferably has the transfer function shown in FIG. 4. In response to the raw digital vector 137, the digital differentiator provides a digital differentiated filtered vector 139 to the interpolator array 114. The interpolator array 114 processes the digital vector 139 to provide a plurality of interpolated digital vectors 141-1 through 141-m. The digital vectors 141-1 through 141-m form a close representation of the digital vector 139 at different sampling times. Each interpolated digital vector 141 is indicative of an upsampled value representative of the differentiated filter signal 139 at a different sample time. One of the interpolated digital vectors 141-1 through 141-m may be a delayed version of the digital vector 139 to simplify the hardware requirements of the interpolator array 114.

The absolute value summer circuit 116 rectifies the interpolated digital vectors 141-1 through 141-m and arithmetically sums them together to provide a digital rectified vector 143, which is indicative of the rectification and summing of the absolute values of the interpolated digital vectors 141-1 through 141-m. The digital rectified vector 143 may be, for example, indicative of the half cycle area of the sync field burst when the channel 100 is processing the servo sync field region. In response to the digital rectified vector 143, the digital gain control circuit 118 provides the digital gain control vector 145 to control the gain setting of the PGA 102. When the servo channel 100 is in a gain acquisition mode, the digital gain control vector 145 is adjusted until the magnitude of the digital rectified vector 143 reaches a predetermined level.

The servo gray code pulse detector 105 includes a programmable coefficient digital finite impulse response (FIR) filter 110 and a digital peak detector 112. The programmable coefficient digital FIR filter 110 equalizes the raw digital vector 137 to provide a digital vector 151. The digital peak detector 112 processes the digital vector 151 to provide digital signals 153 and 155. The digital peak detector 112 can be configured so that the digital signals 153 and 155 either include the servo-pulse signal and the servo pulse-polarity signal, respectively, or include the positive servo-pulse signal and the negative servo-pulse signal, respectively.

The digital position error demodulator 103 includes a digital area integrator 120 and a digital-to-analog converter (DAC) array 122. The digital area integrator 120 integrates the digital rectified vector 143 to generate a plurality of digital vectors 147-1 through 147-n which represent the servo position error signals (digital PES vectors). The digital to analog converter (DAC) array 122 converts the digital PES vectors into analog PES signals 149-1 through 149-n to provide backward compatibility for back-end systems that receive the demodulated PES signals in analog form. Of course if the back-end system receives digital PES signals, the digital position error demodulator 103 need not include the DAC array 122.

Figure 2:
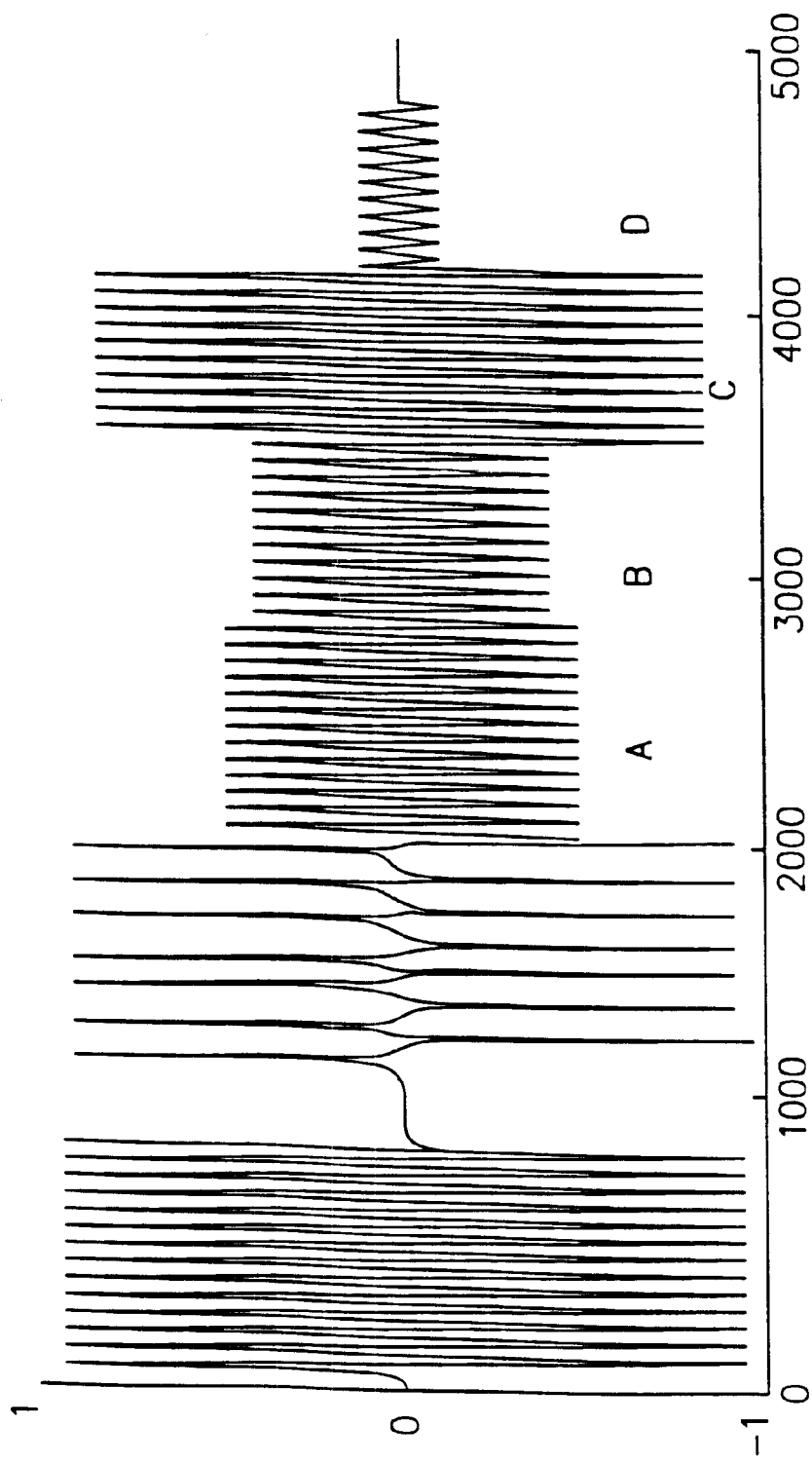
FIG. 2 is a graphical view illustrating a typical servo read back waveform from a conventional magnetic disk drive.

Referring to FIG. 2, there is shown a graphical view illustrating an example of a servo read back waveform of a conventional servo patterns used in magnetic disk drives. The servo read-back waveform typically includes a single frequency servo sync-field 201, a gray-coded servo track/sector ID field 203, an address mark or gap field 202 separating the sync-field 201 from the ID field 203, and also includes a plurality of single frequency servo position error burst signals 204-1 through 204-n. The servo sync field 201 provides a training field for a servo channel (not shown) to adjust its gain control loop. During the track/sector ID field, the servo channel converts received analog pulse patterns into an unambiguous train of digital pulse patterns with low error rate for further processing by back-end controller circuits which only handle digital pulses. The gap field or address mark indicates to the back-end controller the start of the ID field. Typically, the digital pulses to be generated during ID field processing are designed to be located at the peaking instances of the input analog waveform. Thus, a peak detector is commonly used to perform servo pulse detection. Other servo schemes may use the zero crossings of the analog waveform to encode the digital pulse position. In this case, servo pulse detection can still be performed using a peak detector by first differentiating the incoming signal to convert zero-crossings into analog pulse peaks.

The head tracking information is derived from the servo PES fields. Typically, several servo burst fields are written on the disk in a staggered fashion so that the read back amplitude of each one of them will be different and depends on the positioning of the head. A common scheme used in the art is to use four servo PES bursts commonly referred to as the A, B, C and D bursts. By reading the magnitude of burst A, B, C and D, a back-end servo processor can make the correction to guide the head on track. The servo burst demodulator converts the single tone sinusoidal like burst signals from the read back waveform into clean DC signals for representing the magnitude of burst A, B, C and D respectively.

Figure 3:
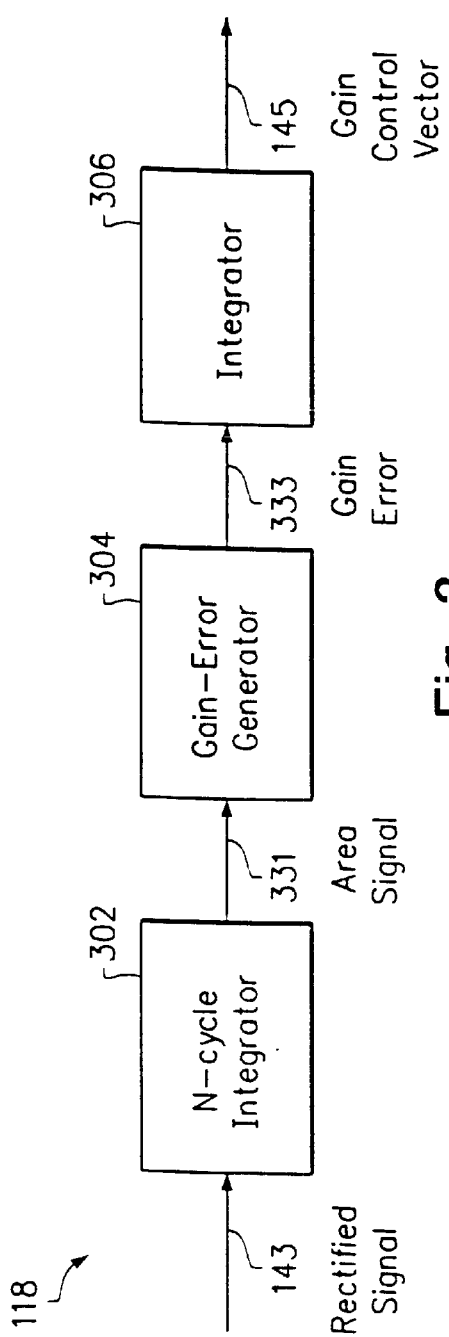
FIG. 3 is a block diagram illustrating a digital area-based gain control circuit of FIG. 1.

Referring to FIG. 3, there is shown a schematic block diagram illustrating the digital area-based gain control circuit 118. The digital gain control circuit 118 includes an N-cycle integrator 302, a gain-error generator 304, and a gain integrator 306. The N-cycle integrator 302 substantially integrates a half cycle of the digital rectified signal 143 to generate an area signal 331. This can be easily achieved by making the half cycle period substantially equal to an integer multiple of the sampling clock period. The half cycle integrated value represents the area of a half cycle in the servo sync-field. The gain-error generator 304 compares the half cycle area value to a predetermined value and generates a gain error signal 333, which is accumulated by the gain integrator 306 during sync-field acquisition to produce the digital gain control vector 145.

Figure 3A:
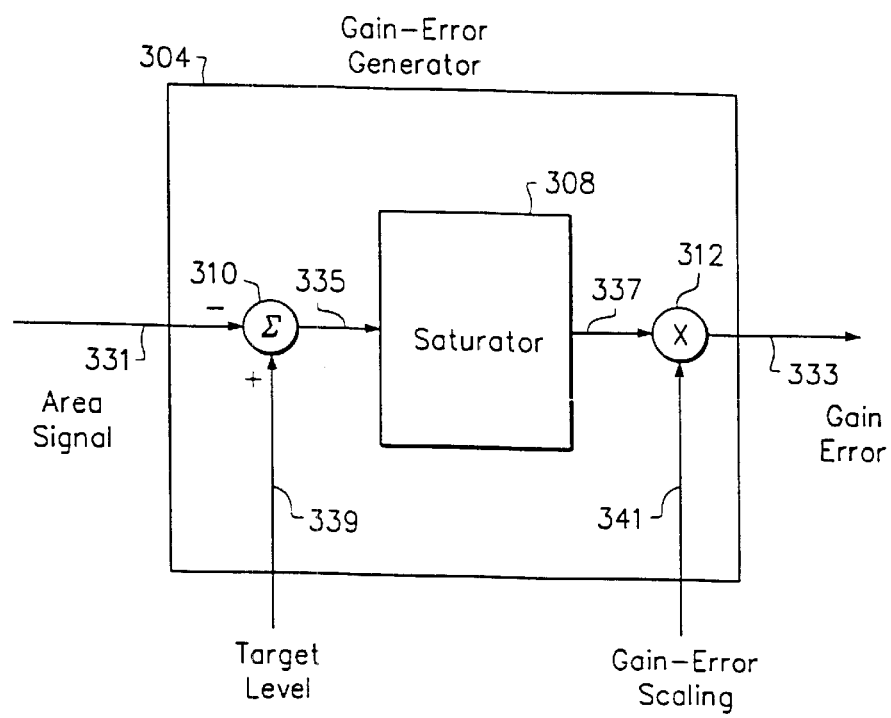
FIG. 3a is a block diagram illustrating an exemplary gain-error generator of FIG. 3.

Referring to FIG 3A there is shown a block diagram illustrating an exemplary gain-error generator 304, which includes a saturator 308, a subtractor 310, and a multiplier 312. The subtractor 310 subtracts the half cycle area signal 331 from a pre-selected target value 339 to produce a raw gain error signal 335. The saturator 308 is a minimum-maximum limiter which processes the raw gain error signal 335 to generate a modified gain error signal 337 having a value that is within a range less than the range of the values of the raw gain error signal 335. The multiplier 312 multiplies the modified gain error signal 337 with a gain-error scaling value 341 to generate the final gain error signal 333. The gain-error scaling value 341 is programmed or hard-wired to achieve the desired gain acquisition tracking bandwidth. Pipeline delays may be added to the gain-error generator 304 to increase the speed of the gain-error generator 304.

Figure 3B:
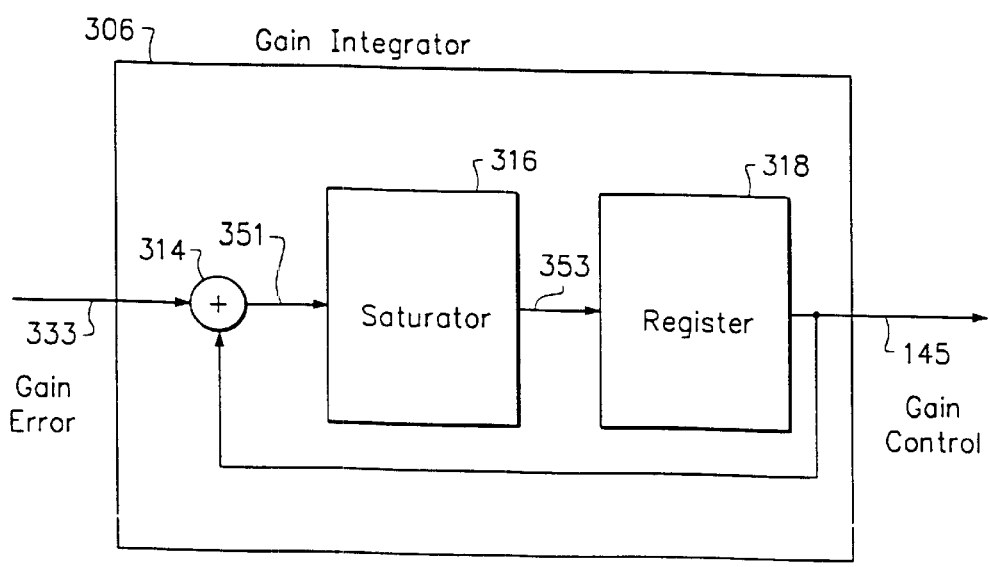
FIG. 3b is a block diagram illustrating an exemplary gain-integrator of FIG. 3.

Referring to FIG. 3b, there is shown a block diagram illustrating an exemplary gain integrator 306 of FIG. 3. The gain integrator 306 includes an adder 314, a saturator 316, and a register 318. During normal accumulation, the adder 314 adds the gain error signal 333 to the digital gain control signal 145 to produce a next gain control signal 351. The saturator 316 limits the range of the next gain control signal 351 to generate a range-limited gain control signal 353. The register 318 receives the range-limited gain control signal 353 and transfers out the digital gain control signal 145 in the next accumulator update cycle. The saturator 316 prevents overflow and underflow of the arithmetic operation involved in integration.

Figure 4:
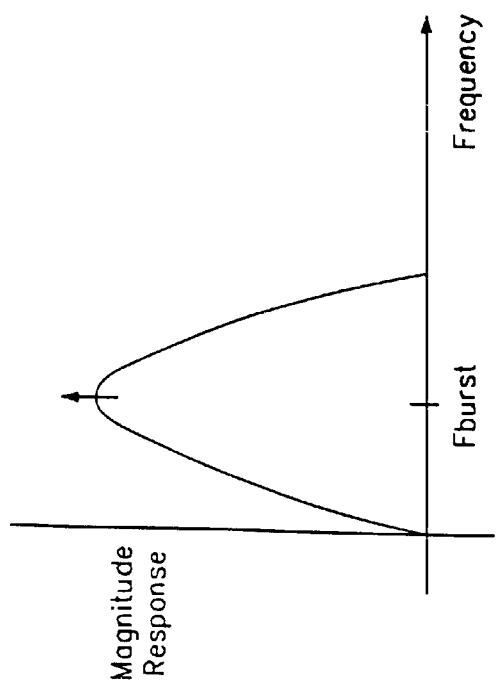
FIG. 4 is a graph illustrating the desired magnitude transfer function for the differentiating band-pass filter of FIG. 1.

Referring to FIG. 4, there is shown a graph illustrating the magnitude transfer function for the differentiating band-pass filter 108. Since the sync-field as well as the PES burst fields are single tone frequency pattern, it is advantageous to use a bandpass filter to pass the desired burst signals and reject other noise components as much as possible. Towards this end, a differentiating bandpass filter may be used because of its extra capability of rejecting DC offset value from the input signal. The desired magnitude transfer function is shown in FIG. 4 The transfer function is zero at DC, peaks at around the frequency of the sync/PES field fundamental frequency, and drops to a low value after twice the peaking frequency. The filter simultaneously rejects the DC component as well as the high frequency noise component in the digitized signal 139. The filter may be, for example, an FIR filter. For a simplified implementation, the filter may be an FIR filter with fixed binary coefficients of simple powers of two. For a servo channel operating at a sampling clock of approximately 8 times the burst frequency, an FIR filter with coefficients having relative values of 1,2,1,0,-1,-2,-1 may be used.

Figure 5:
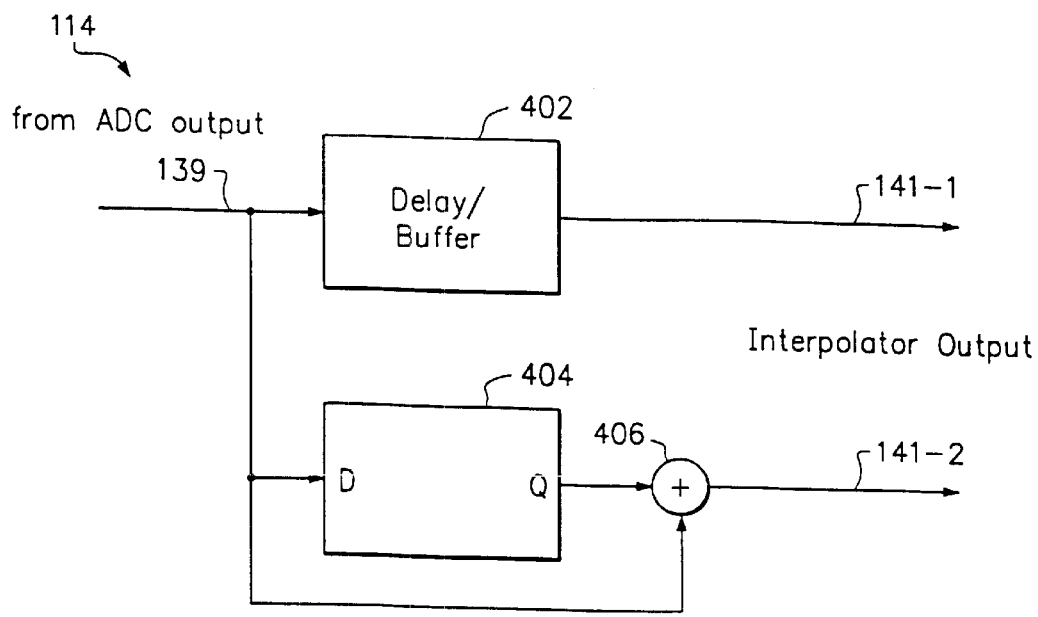
FIG. 5 illustrates an implementation of the interpolator array of FIG. 1 for m=2, which is the preferred embodiment of the present invention.

Referring to FIG. 5, there is shown a block diagram illustrating an exemplary interpolator array 114. For clarity, an interpolator array 114 with m=2 is shown. The interpolator array 114 includes a delay/buffer 402, a delay circuit 404, and an adder 406. General signal interpolation can be performed using FIR filters of appropriate coefficients and is well known in the art. For a simple hardware implementation, the delay/buffer 402 provides the first interpolated value 141-1 which equals a delayed/buffered value of the digital vector 139. The delay circuit 404 provides a delayed digital vector 139 to the adder 406, which adds the delayed vector to the digital vector 139 to generate the second interpolated value 141-2. The second interpolated value 141-2 is an equally weighted average of consecutive sample points. The average may be generated by an FIR filter with filter coefficients of (0.5, 0.5), which is a linear interpolation scheme. A higher level of interpolation with m>2 is achieved with linear interpolation with general coefficients of (c, 1−c). Higher order interpolation with more FIR coefficients may be used to improve the interpolation result.

Figure 6:
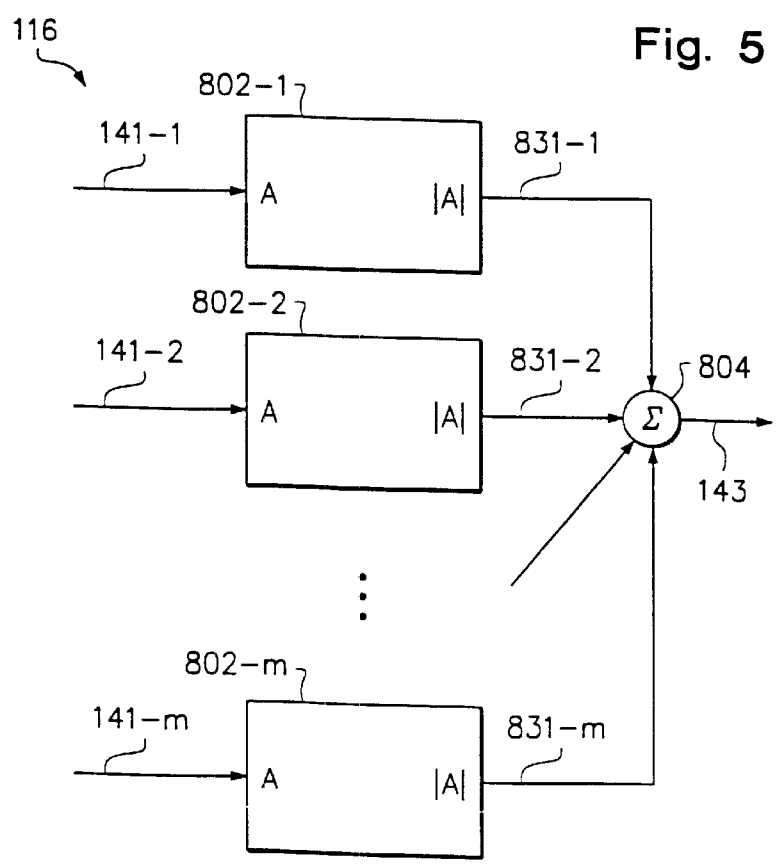
FIG. 6 is a block diagram of the absolute value summer circuit of FIG. 1.

Referring to FIG. 6, there is shown a block diagram illustrating the absolute value summer circuit 116, which includes absolute value generators 802-1 through 802-m, and a summer 804. The absolute value generators 802-1 through 802-m generate respective absolute value signals 831-1 through 831-m, which are the absolute value of respective interpolated digital vectors 141-1 through 141-m provided by the interpolator array 114. The summer 804 sums the absolute value signals 831-1 through 831-m together to produce the digital rectified vector 143. A number m of interpolated digital vectors 141 greater than 1 reduces the variation in the absolute-area integration values due to uncertain phase relationship between the incoming analog input signal 131 and a digital system clock (not shown).

Figure 7:
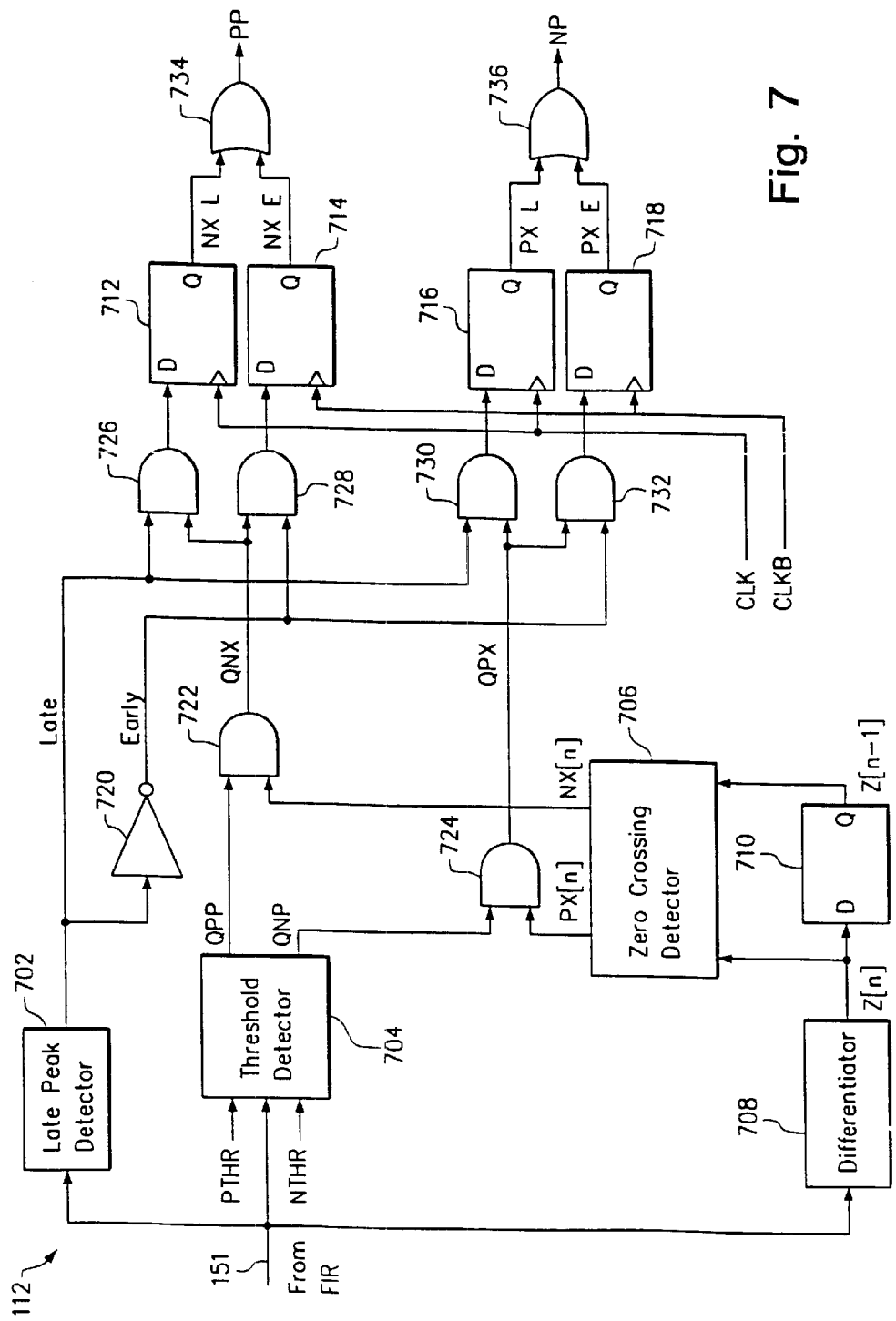
FIG. 7 is the block diagram illustrating the digital peak detector of FIG. 1 in accordance with the present invention.
Figure 8:
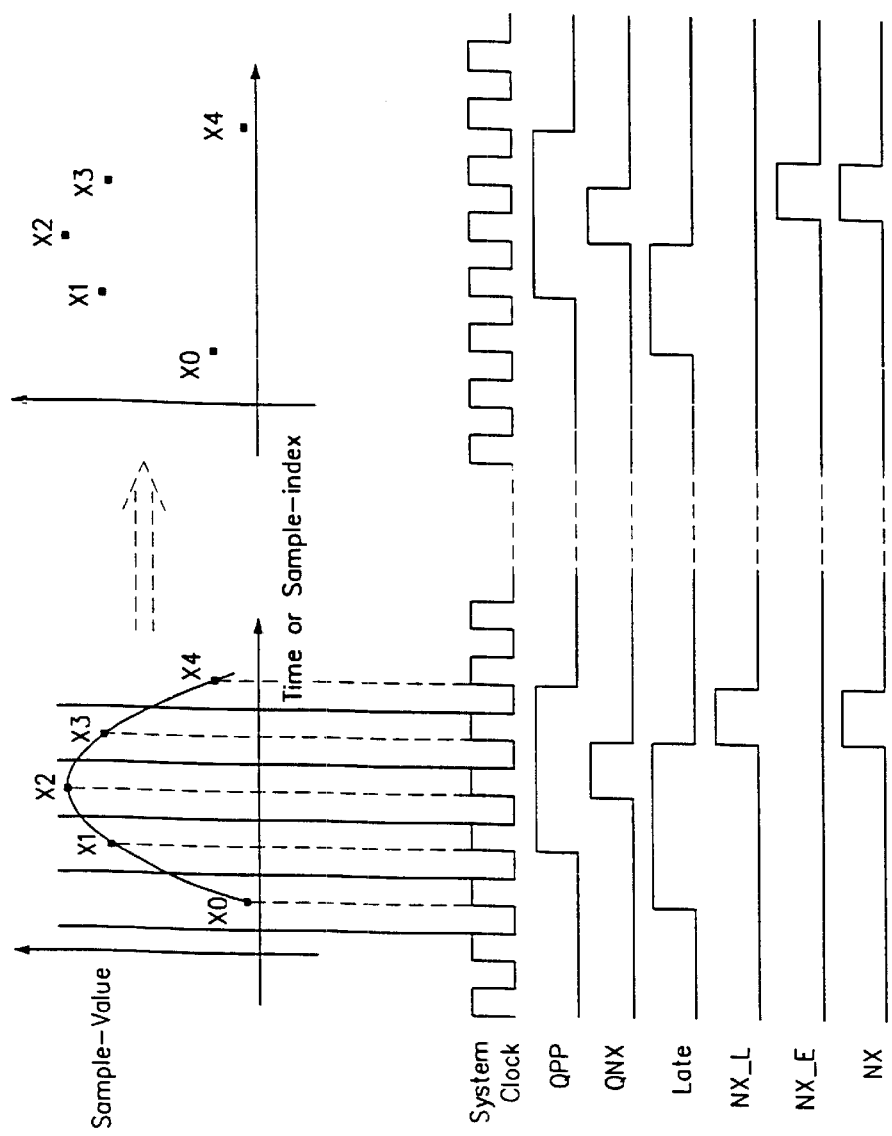
FIG. 8 is a timing diagram illustrating the internal timing of the peak detector circuit of FIG. 7.

Referring to FIG. 7, there is shown a block diagram illustrating the digital peak detector 112. Referring to FIG. 8, there is shown a timing diagram illustrating the timing of the digital peak detector 112. The digital peak detector 112 includes a late peak detector 702, a threshold detector 704, a zero-crossing detector 706, a differentiator 708, delay circuits 710, 712, 714, 716, and 718, an invertor 720, AND gates 722, 724, 726, 728, 730, and 732, and OR gates 734 and 736. The digital peak detector 112 performs signal peak detection in a digital domain as opposed to an analog domain. The output signals of the digital peak detector 112 are pulses similar to those of an analog peak detector. Because the digital peak detector 112 operates at a finite clock operating frequency, the digital output pulses occur on the sampling clock edges. This introduces time quantization effects, reducing the accuracy of recovered peak position compared to an analog peak detector. To mitigate the time quantization effect, the peak detector circuit 112 uses both the rising and falling edges (i.e., both clock phases) of the system sampling clock to generate the output pulses. This effectively doubles the sampling rate of the system to improve the precision in the recovery of the peak positions in the incoming signal.

The threshold detector 704 produces QPP and QNP signals. The QPP signal is asserted any time that the input digital vector 151 exceeds a programmed positive threshold PTHR. Similarly, the QNP signal is asserted any time the input digital vector 151 is below a programmed negative threshold NTHR. The QNP and QPP signals are used to qualify only peaks that exceeds the specified threshold NTHR and PTHR, respectively, to reject unwanted peaks around the base-line of the input digital vector 151. A peak in the input digital vector 151 is typically detected by detecting a zero crossing in the input digital vector 151. This is typically done by first differentiating the input digital vector 151 so that peak locations become zero-crossing locations. The zero-crossing detector 706 detects zero-crossing for both positively going and negatively going signal transitions. The state equations of the digital peak detector 112 are as follows:

The state equations for the threshold detector 704 are:

$$QNP[n]=X[n]<*NTHR \qquad (1)$$

$$QPP[n]=X[n]>*PTHR \qquad (2)$$

The state equations for the differentiator 708 are:

$$Z[n]=X[n]-X[n-1] \qquad (3)$$

The state equations for the zero-crossing detector 706 are either:

equations (4a) and (5a)

$$PX[n]=(Z[n]>=0) \text{ AND } (Z[n-1]<0) \qquad (4a)$$

$$NX[n]=(Z[n]<=0) \text{ AND } (Z[n-1]>0) \qquad (5a)$$

or equations (4b) and (5b)

$$PX[n]=(Z[n]>0) \text{ AND } (Z[n-1]<=0) \qquad (4b)$$

$$NX[n]=(Z[n]<0) \text{ AND } (Z[n-1]>=0) \qquad (5b)$$

The state equation for the valid/qualified zero-crossing determined by the AND gates 722 and 724 are:

$$QNX[n]=PX[n] \text{ AND } QNP[n-1] \qquad (6)$$

$$QPX[n]=NX[n] \text{ AND } QPP[n-1] \qquad (7)$$

where in equations (1) through (7), 1. the operator, "<*" can be either less-than "<" or less-than-or-equal-to "<=";
2. the operator ">*" can be either greater-than ">" or greater-than-or-equal-to ">=";
3. X[n] is the incoming input vector 151 from the FIR filter 110;
4. Z[n] is a difference input vector,
5. PX[n] indicates the occurrences of all negative peaks of X[n] or all positive going zero-crossings of Z[n];
6. NX[n] indicates the occurrences of all positive peaks of X[n] or all negative going zero-crossings of Z[n];
7. QNX[n] indicates the presence of a positive peak in X[n] that exceeds the specified positive threshold PTHR;
8. QPX[n] indicates the presence of a peak in X[n] that exceeds the specified negative threshold NTHR.

The state equations (1) through (7) provide a simple means of implementing the digital peak detector 112. The digital peak detector 112 operates on the system sampling clock. Hence, the QNX signal changes value only after the triggering clock edge. To reduce the time quantization effect, the other clock phase of the system clock is also utilized. To do this, the pulse peak position is further determined to occur either early in the clock cycles or late in the clock cycles. The following state equations determine the position of the pulse peak:

The state equation for the early/late peak location detector 702 and the inverter 720 are:

$$\text{Late}[n]=(X[n+1]>*X[n-1]) \text{ AND } (X[n]>*0) \text{ OR } (X[n+1]<*X[n-1]) \text{ AND } (X[n]<*0) \qquad (8)$$

$$\text{Early}[n]=\text{NOT Late}[n] \qquad (9)$$

The state equations for the pulse shifting of the AND gates 726, 728, 730, and 732, and the OR gates 734 and 736 are:

$$NX\_E[n+0.5]=\text{Early}[n-1] \text{ AND } QNX[n] \qquad (10)$$

$$PX\_E[n+0.5]=\text{Early}[n-1]\text{ AND } QPX[n] \quad (11)$$

$$NX\_L[n+1]=\text{Late}[n-1]\text{ AND } QNX[n] \quad (12)$$

$$PX\_L[n+1]=\text{Late}[n-1]\text{ AND } QPX[n] \quad (13)$$

$$NX=NX\_E[n+0.5] \text{ OR } NX\_L[n+1] \quad (14)$$

$$PX=PX\_E[n+0.5] \text{ OR } PX\_L[n+1] \quad (15)$$

where in equations (8) through (15), 1. the 0.5 in NX_E[n+0.5] and PX_E[n+0.5] indicates that both signals are latched on the second phase of the system clock.
2. the 1 in NX_L[n+1] and PX_L[n+1] indicates that both signals are latched on the main (first) phase of the system clock.
3. NX is the final positive pulse peak output of the peak detector 112.
4. PX is the final negative pulse peak output of the peak detector 112.

The state equations (8) through (15) shift the output pulses by a half clock period relative to the sample point depending on whether the actual signal peak would have occurred early or late relative to the digital peak sample point, as illustrated in FIG. 8. In this case, if the actual peak would have occurred after the digital peak sample point X2 of FIG. 8, the output pulse lines up with the system clock and is sent out on the next system clock cycle. If the actual peak position would have occurred before the digital sample peak position, the output pulse is latched earlier by the second phase of the system clock.

To obtain the more common servo output format of a composite pulse output (occurrence of either positive or negative peaks) and peak polarity output, the digital peak detector 112 may include a simple circuit (not shown) comprising an OR gate and an RS flip-flop. The additional OR gate provides the composite pulse output as the OR of the NX and PX signals. The output of the RS flip-flop provides the pulse polarity output. The Reset and Set inputs of the RS flip-flop are separately connected to the NX and PX signals.

Figure 9:
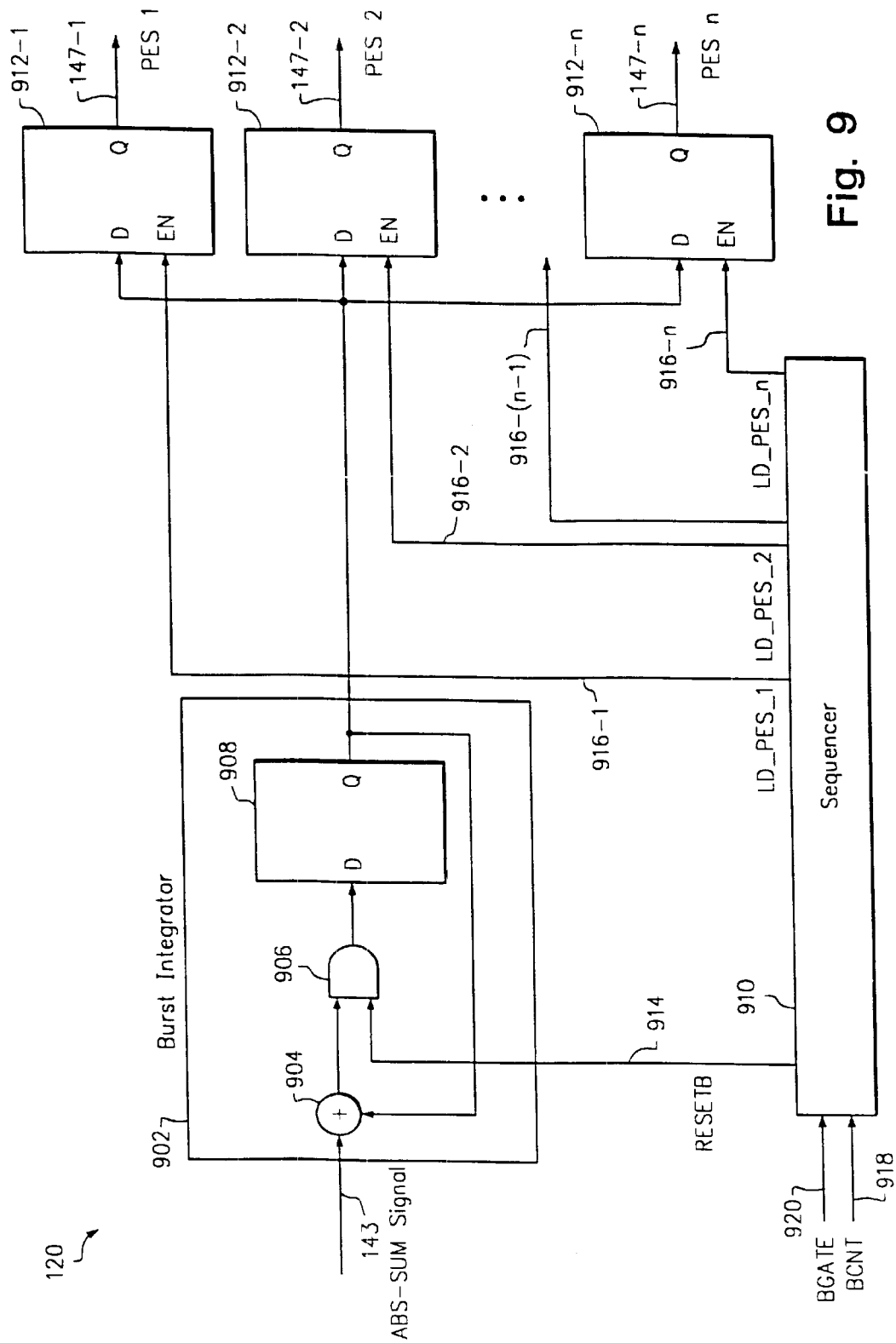
FIG. 9 is a block diagram illustrating the digital area integrator of FIG. 1 in accordance with the present invention.

Referring to FIG. 9, there is shown a schematic block diagram illustrating the digital area integrator 120, which includes a burst integrator 902, a sequencer 910, and a plurality of PES holding registers 912-1 through 912-n. The digital area integrator 120 demodulates the digital rectified vector 143 to generate the servo position error vectors 147. The sequencer 910 generates a reset signal 914 and a plurality of load signals 916-1 through 916-n in response to a servo gate (BCNT) signal 918 and a burst gate (BGATE) signal 920.

The burst integrator 902 includes an adder 904, an AND gate 906, and an accumulator register 908. The burst integrator 902 integrates the incoming rectified signal 143 when the reset signal 914 is deasserted, and resets the accumulation register 908 when the reset signal 914 is asserted. At the end of every integration sequence, the sequencer 910 simultaneously asserts one of the plurality of load signals 916-1 through 916-n, which enables loading of the value at the output of the accumulator register 908 before it is reset. The PES holding registers 912-1 through 912-n are sequentially loaded with the demodulated PES values of the corresponding servo burst field. The output of the registers 912-1 through 912-n provide the respective digital vectors 147-1 through 147-n, which may be read directly by a servo digital signal processing controller (not shown) or they can be converted in analog signals using the digital to analog converters 122 for backward compatibility to older servo systems that receive the demodulated signals in analog form.

Figure 9A:
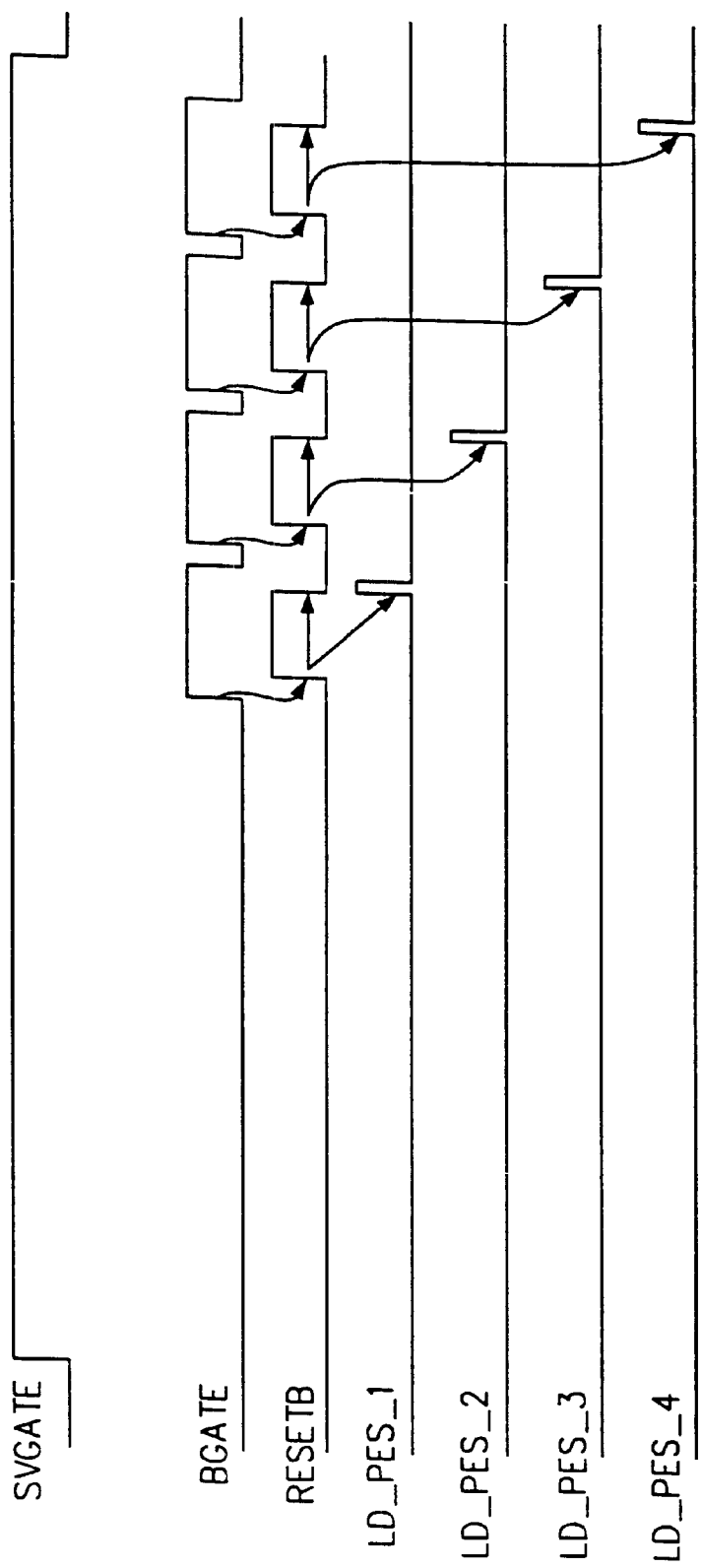
FIG. 9a is an illustration of the internal timing of the digital area integrator of FIG. 9.

Referring to FIG. 9a, there is shown a timing diagram illustrating the timing of integrate/load cycle of the PES signals by sequencer 910. The sequencer 910 is enabled when the servo gate signal 918 is asserted. The sequencer 910 generates a synchronized integrate/reset sequence on the reset line 914 in response to the burst gate signal 920. The integrate cycle lasts for a programmed number of system clock cycles. At the end of the first integration cycle for the first PES burst field, the integrate cycle is terminated, and the load signal 916-1 is asserted to allow loading of the integrated value of the burst integrator 902 into the first PES holding register 912-1. Subsequent burst gate assertion/deassertion cycles enable more integration cycles, but the sequencer 910 directly loads the integrated values into other PES holding registers 912-2 through 912-n by sequential asserting the load signals 916-2 through 916-n.

I claim:

1. Digital servo apparatus comprising:

a programmable gain amplifier having a first input for receiving an analog input signal and having a second input for receiving a gain control signal to produce an amplified analog signal indicative of the analog input signal and the gain control signal;

a converter coupled to receive the amplified analog signal for producing a digital representation thereof;

a differentiating filter coupled to receive the digital representation of the amplified analog signal for producing therefrom a differentiated filtered signal;

an interpolator coupled to receive the differentiated filtered signal for producing therefrom a plurality of outputs, each representative of the differentiated filtered signal at a different sampling time;

a summing circuit coupled to receive the plurality of outputs for producing therefrom an output signal indicative of the absolute values of the plurality of outputs; and a control circuit coupled to receive the output signal produced by the summing circuit for supplying a representative gain control signal to the second input of the programmable gain amplifier to alter the gain thereof.

2. Digital servo apparatus comprising:

amplifier means having a first input to receive an input signal and having a second input to receive a gain control signal for producing an amplified signal indicative of the input signal and the gain control signal;

converter means for producing a digital representation of the amplified signal;

differentiating filter means for producing a differentiated filtered signal from the digital representation of the amplified analog signal;

interpolator means for producing a plurality of outputs from the differentiated filtered signal, each output being representative of the differentiated filtered signal at a different sampling time;

summing means for producing an output signal indicative of the absolute values of the plurality of outputs; and circuit means responsive to the output signal from the summing circuit for supplying a representative gain control signal to the second input of the amplifier means to alter the gain thereof.

3. A gain control method comprising:

selectively amplifying an input signal in response to a gain controlling signal;

differentiating filtering a digital representation of the amplified input signal to produce a filtered signal;

producing a plurality of outputs from the filtered signal at different sampling intervals;

summing the plurality of outputs to produce an absolute value therefrom; and supplying the gain controlling signal indicative of the absolute value.

4. A gain control method comprising:

selectively amplifying an analog input signal in response to a gain controlling signal;

converting the amplified analog input signal to a digital representation thereof;

differentiating filtering a digital representation of the amplified input signal to produce a filtered signal;

producing a plurality of outputs from the filtered signal at different sampling intervals;

summing the plurality of outputs to produce an absolute value therefrom; and supplying the gain controlling signal indicative of the absolute value.

5. A closed loop automatic gain control comprising:

a programmable gain amplifier having a first input responsive to an input signal and a second input responsive to a gain control signal;

a differentiating filter responsive to an output of said programmable gain amplifier;

an interpolator to up-sampling convert an output from said differentiating filter to provide a plurality of outputs;

an absolute value summer responsive to the plurality of outputs from said interpolator; and a gain control circuit responsive to an output of said absolute value summer to provide the gain control signal to said programmable gain amplifier.

6. A closed loop automatic gain control according to claim 5, further comprising:

an analog to digital converter coupled between said programmable gain amplifier and said differentiating filter.

7. A closed loop automatic gain control according to claim 6, further comprising an analog filter coupled between the programmable gain amplifier and the analog to digital converter.

8. A closed loop automatic gain control according to claim 5, wherein said interpolator comprises a plurality of interpolators.

9. A closed loop automatic gain control comprising:

programmable gain amplifier means for amplifying an input signal, said programmable gain amplifier means being responsive to a gain control signal;

differentiating filter means for filtering an output of said programmable gain amplifier means;

interpolator means for up-sample converting an output from said differentiating filter means to provide a plurality of output signals;

absolute value summer means for rectifying the plurality of output signals from said interpolator means; and gain control circuit means responsive to said absolute value summer means for supplying the gain control signal to said programmable gain amplifier means.

10. A closed loop automatic gain control according to claim 9, further comprising:

analog to digital converter means arranged between said programmable gain amplifier means and said differentiating filter means for converting an analog output of said programmable gain amplifier means to a digital signal.

11. A closed loop automatic gain control according to claim 9, further comprising:

analog filter means arranged between said programmable gain amplifier means and said analog to digital converter means for filtering the output of said programmable gain amplifier means.

12. A closed loop automatic gain control method comprising the steps of:

(a) programmably amplifying an input signal in response to a gain control signal;

(b) differentiatingly filtering an output of step (a);

(c) up-sampling an output from step (b) to provide a plurality of up-sampled signals;

(d) providing a rectified signal in response to the plurality of up-sampled signals provided in step (c); and (e) generating the gain control signal for step (a) in response to step (d).

13. A closed loop automatic gain control method comprising the steps of:

(a) programmably amplifying an input signal in response to a gain control signal;

(b) differentiatingly filtering an output of step (a);

(c) up-sampling an output from step (b) to provide a plurality of output signals;

(d) summing absolute values of the plurality of output signals provided in step (c); and (e) generating the gain control signal for step (a) in response to step (d).

* * * * *

UNITED STATES PATENT AND TRADEMARK OFFICE
CERTIFICATE OF CORRECTION

PATENT NO.    : 6,430,238 B1
DATED         : August 6, 2002
INVENTOR(S)   : Sutardja It is certified that error appears in the above-identified patent and that said Letters Patent is hereby corrected as shown below:

<u>Title page,</u>
Item [73], Please correct the assignee to -- Marvell International, LTD., Hamilton (BM) --

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,430,238 B1 | Page 1 of 1 |
| APPLICATION NO. | : 09/605133 | |
| DATED | : August 6, 2002 | |
| INVENTOR(S) | : Pantas Sutardja | |

It is certified that error appears in the above-identified patent and that said Letters Patent is hereby corrected as shown below:

Column 4, Line 26    Delete "146" and insert -- 145 --
Column 5, Line 22    Delete "a" after "of"

Signed and Sealed this

Fourth Day of September, 2007

JON W. DUDAS
*Director of the United States Patent and Trademark Office*